US008993038B2

(12) United States Patent
Jobe et al.

(10) Patent No.: US 8,993,038 B2
(45) Date of Patent: Mar. 31, 2015

(54) MINERAL FEED SUPPLEMENT

(76) Inventors: Patrick A. Jobe, Becker, MN (US); Clinton B. Calk, Amarillo, TX (US); David A. Cook, Coon Rapids, MN (US); Steven J. Engelmeyer, Elk River, MN (US); Timothy C. Gouldie, Garden City, KS (US); Bradley G. Krusa, Amarillo, TX (US); Leonardo A. Vivas Luna, Eden Prairie, MN (US); Mark D. Newcomb, Independence, MN (US); Brian T. Parham, Amarillo, TX (US); Jennifer L. G. van de Ligt, Brooklyn Park, MN (US)

( * ) Notice: Subject to any disclaimer, the term of this patent is extended or adjusted under 35 U.S.C. 154(b) by 343 days.

(21) Appl. No.: 12/637,519

(22) Filed: Dec. 14, 2009

(65) Prior Publication Data

US 2010/0092618 A1   Apr. 15, 2010

Related U.S. Application Data

(63) Continuation of application No. 11/230,309, filed on Sep. 19, 2005, now abandoned.

(60) Provisional application No. 60/611,510, filed on Sep. 20, 2004, provisional application No. 60/685,730, filed on May 27, 2005, provisional application No. 60/712,913, filed on Aug. 31, 2005.

(51) Int. Cl.
| | |
|---|---|
| A23K 1/18 | (2006.01) |
| A23K 1/22 | (2006.01) |
| A23K 1/00 | (2006.01) |
| A23K 1/16 | (2006.01) |
| A23K 1/175 | (2006.01) |
| A23L 1/30 | (2006.01) |
| A23L 1/304 | (2006.01) |

(52) U.S. Cl.
CPC . *A23K 1/18* (2013.01); *A23K 1/003* (2013.01); *A23K 1/164* (2013.01); *A23K 1/175* (2013.01); *A23K 1/1751* (2013.01); *A23K 1/22* (2013.01); *A23L 1/30* (2013.01); *A23L 1/304* (2013.01); *A23V 2002/00* (2013.01); *Y10S 426/807* (2013.01)
USPC .............. 426/648; 426/74; 426/69; 426/807; 426/454

(58) Field of Classification Search
USPC ................. 426/74, 807, 453, 454, 69, 648
IPC .................. A23K 1/003,1/164, 1/175, 1/1751, A23K 1/18, 1/22; A23L 1/30, 1/304
See application file for complete search history.

(56) References Cited

U.S. PATENT DOCUMENTS

| | | | |
|---|---|---|---|
| 2,813,299 A | | 11/1957 | Massey |
| 2,847,710 A | * | 8/1958 | Pitzer ............................ 264/109 |
| 3,249,441 A | * | 5/1966 | Reynolds et al. ............... 426/69 |
| 3,416,928 A | | 12/1968 | Freese |
| 3,573,924 A | * | 4/1971 | Zarow ............................ 426/69 |
| 4,153,735 A | | 5/1979 | Mommer |
| 4,415,547 A | | 11/1983 | Yu et al. |
| 4,642,238 A | | 2/1987 | Lin et al. |
| 4,775,539 A | | 10/1988 | Van de Walle |
| 4,842,863 A | | 6/1989 | Nishimura et al. |
| 4,929,163 A | * | 5/1990 | Volk, Jr. ........................ 425/143 |
| 4,988,520 A | | 1/1991 | Overton |
| 5,285,681 A | * | 2/1994 | Binder et al. ..................... 73/78 |
| 5,391,371 A | | 2/1995 | Jacobsen et al. |
| 5,567,452 A | | 10/1996 | Rebhan |
| 5,629,038 A | | 5/1997 | Kalmbach |
| 5,686,111 A | | 11/1997 | Jalbert |
| 5,686,125 A | | 11/1997 | Mueller |
| 5,786,007 A | | 7/1998 | Webb |
| 5,871,802 A | * | 2/1999 | Gao et al. ...................... 426/635 |
| 6,024,993 A | | 2/2000 | Theuninck et al. |
| 6,120,815 A | | 9/2000 | Moore |
| 6,221,424 B1 | | 4/2001 | Kalmbach |
| 6,238,709 B1 | * | 5/2001 | Kalmbach ......................... 426/2 |
| 6,238,727 B1 | * | 5/2001 | Takemoto et al. ............. 426/656 |
| 6,293,994 B1 | | 9/2001 | Field et al. |
| 6,306,427 B1 | | 10/2001 | Annonier et al. |
| 6,365,208 B1 | | 4/2002 | Kulkarni et al. |
| 6,436,453 B1 | | 8/2002 | Van Lengerich et al. |
| 2003/0148013 A1 | | 8/2003 | Jobe et al. |
| 2003/0170371 A1 | | 9/2003 | Jobe et al. |
| 2004/0052905 A1 | | 3/2004 | Pelletier et al. |
| 2005/0163911 A1 | | 7/2005 | McGowen et al. |
| 2006/0045957 A1 | * | 3/2006 | Bevans et al. ................. 426/656 |
| 2006/0127531 A1 | | 6/2006 | Jobe et al. |
| 2006/0198928 A1 | | 9/2006 | Jobe et al. |

FOREIGN PATENT DOCUMENTS

| | | |
|---|---|---|
| CN | 1069171 A | 2/1993 |
| EP | 0125894 | 11/1984 |
| GB | 1316377 | 5/1973 |

(Continued)

OTHER PUBLICATIONS

Derwent Record, Aliev, A.A., SU0670293T, "Sheep Feed Composition," 1 pg.

(Continued)

*Primary Examiner* — Chhaya Sayala

(57) ABSTRACT

A mineral supplement is described herein that has a high mineral and/or nitrogen content and is capable of being formed into a pellet. The mineral supplement may comprise a heat sink that absorbs heat during processing, thus facilitating the formation of the mineral supplement as a pellet.

13 Claims, No Drawings

(56) References Cited

FOREIGN PATENT DOCUMENTS

| | | |
|---|---|---|
| GB | 2123671 | 2/1984 |
| WO | 98/09538 | 3/1998 |
| WO | 98/09538 A1 | 3/1998 |
| WO | 01/01790 | 1/2001 |
| WO | WO 2006/034098 | 3/2006 |

OTHER PUBLICATIONS

Stewart, et al., "Mineral Supplements for Beef Production," The University of Georgia College of Agriculture & Environmental Sciences Cooperative Extension Service, pp. 1-9, (1994).

Super-Lube Feed Additives, Lubricant for Hard-To-Pellet-Feeds, Uniscope, Inc., 1 pg. (2007).

Vitamex, "Granulor," 2 pgs. (copyright 2003).

*Verdegaal Bros. Inc . v. Union Oil Company of California*, 2 USPQ2d 1051, U.S. Court of Appeals Federal Circuit, No. 86-1258, 814 F2d 628, decided Mar. 12, 1987, pp. 1-5.

*Hansgirg* v. *Kemmer*, 40 USPQ 665, Court of Customs and Patent Appeals, Appl. No. 4077, decided Feb. 27, 1939, pp. 1-4.

Mommer, Jr., et al., "A Guide to Feed Pelletizing Technology," Uniscope, Inc., pp. 1-22 (2002).

International Search Report PCT/US2005/033287, mailed Jan. 19, 2006, 2 pages.

1 page downloaded from https://en.wikipedia.org/wiki/Molasses on Aug. 13, 2009.

\* cited by examiner

MINERAL FEED SUPPLEMENT

CROSS REFERENCE TO RELATED APPLICATIONS

This application is a continuation and claims the benefit under 35 U.S.C. §120 of U.S. patent application Ser. No. 11/230,309 (filed Sep. 19, 2005), now abandoned, and entitled "Mineral Feed Supplement", which claims the benefit under 35 U.S.C. §119(e) of: (1) U.S. Provisional Patent Application Ser. Nos. 60/611,510 (filed Sep. 20, 2004), and entitled "Mineral Feed Supplement"; (2) U.S. Provisional Patent Application No. 60/685,730 (filed May 27, 2005), and entitled "Mineral Feed Supplement"; and (3) U.S. Provisional Patent Application No. 60/712,913 (filed Aug. 31, 2005), and entitled "Mineral Feed Supplement", the disclosures of which are all incorporated herein by reference.

BACKGROUND

Proper nutrition is a key element to maintaining animal health and to increasing the overall productivity of animals. This is especially true for farm animals such as cattle (beef cattle, dairy cattle, etc.), swine, sheep, and the like. An important element of a nutritionally balanced diet are minerals and other components such as a suitable nitrogen source. Although some minerals may be inherently included in bulk animal feed (e.g., alfalfa, grain material, etc.), it is often desirable to supplement the bulk feed with additional minerals and other nutrients to provide optimum animal performance and health.

In the past, the mineral and/or nitrogen content of animal feed has been supplemented by adding minerals to the animal feed at the time of feeding in the form of a granule added to the feed. This was traditionally done by spreading the minerals over the top of the animal feed in the feeding area. The minerals were often much smaller than the bulk feed and thus tended to migrate to the bottom of the feeder before the animal could eat it. Also, the animals often eat the feed in a way that scatters the minerals around the area, which further reduces the amount of minerals the animals intake. Because of these and other factors, the amount of minerals that the animal received varied widely from one feeding to the next. The health and/or performance of the animals suffered as a result.

One way to make the mineral supplement more suitable for the animal to eat is to pellet the mineral supplement. Unfortunately, a mineral pellet is difficult to produce using conventional pelleting equipment because, during pelleting, the minerals tend to score the surface of the die and may even plug the die. This is especially true for mineral pellets having a high mineral content. Also, pellets having a high mineral content were often crumbly and generally considered low quality—so much so that they were of little use as an animal feed.

It would be desirable to provide a mineral supplement having a high concentration of a mineral source and/or nitrogen source. A mineral supplement of this nature requires less material to be processed to provide the same nutritional value as other lower mineral concentration supplements. Thus, the processing of the mineral supplement is made more efficient. In addition, mineral supplements with higher mineral concentrations can be transported and sold in bulk while reducing capacity requirements of storage facilities and shipping containers. A mineral supplement is described herein which typically has an elevated mineral source and/or nitrogen source concentration that is capable of being processed in a conventional pellet mill.

SUMMARY

The present application relates to a pelleted mineral supplement having an ingredient component which includes relatively substantial amount of a mineral source and/or non-protein nitrogen source. The mineral supplement typically includes a component which is capable of acting to absorb heat, e.g., such as heat which maybe generated by friction created as the mineral supplement is processed in a pelleting device. This component is also referred to herein as a "heat sink" or "heat sink material." The heat sink material may be a component of the material that makes up the mineral source and/or non-protein nitrogen source. In other embodiments, the heat sink material may be an additional component which is incorporated with the mineral source and/or non-protein nitrogen source and other optional components to make up the mineral supplement. If desired, the pelleted mineral supplement may include other nutrient material(s) in addition to the mineral source and/or non-protein nitrogen source. For example, the supplement may include materials such as vitamins, carbohydrate and/or fiber based filler(s), and/or edible materials which can act as a binder.

The term "ingredient component" as used herein refers to the mineral source(s) and the non-protein nitrogen source(s), if any, that is in the mineral supplement. Advantageously, the mineral supplement described herein includes an elevated amount of the ingredient component, e.g., at least about 50 wt. % of the mineral supplement and, in some embodiments, 60 wt. % or higher, or, desirably, 65 wt. % or higher. Also, the mineral supplement may include an edible material that has a melting point of about 50° C. to 200° C. and/or dehydrates at about 50° C. to 200° C. The mineral supplement may also have a PDI of at least about 75%.

While not wishing to be bound by theory, it is believed that the material or materials that function as the heat sink absorb heat during pelleting and prevent the pelleting equipment from becoming too hot. The mineral supplement may include a sufficient quantity of the heat sink material to absorb a sufficient amount of heat generated during the pelleting process to prevent damage to the pelleting equipment. A lubricant may also be included in the mineral supplement to allow the supplement blend that is formed from the various components to easily pass through the pelleting equipment. The heat sink material and/or the lubricant prevent the pelleting equipment from being excessively scored, heated, or otherwise damaged during pelleting.

It should be appreciated that the heat sink material may include materials that can also be considered a mineral source, a non-protein nitrogen source, lubricant, or any other material that may be in the mineral supplement. Thus, the use of the terms "heat sink," "mineral source," "non-protein nitrogen source," "lubricant," etc. are not meant to refer to components or materials that are mutually exclusive of each other. Rather there may be and likely will be at least some overlap between the materials that fall under these terms (e.g., urea can be a non-protein nitrogen source and a heat sink).

In one embodiment, the edible material may include a hydrophobic component. The hydrophobic component may include a combination of components or may be a single component. For example, in one embodiment, the hydrophobic component may include a combination of a high melting hydrophobic substance and another hydrophobic substance or component having a lower melting point such as the lubricant. The hydrophobic component commonly has a melting point of at least about 45° C., desirably, at least about 50° C., or, suitably, at least about 55° C.

The mineral supplement may also optionally include a binder, filler, vitamins, medicaments, enzymes, and dyes. In one embodiment, the mineral supplement may include at least about 50 wt. % of the ingredient component. In another embodiment, the mineral supplement may include at least about 1 wt. % or suitably at least about 2 wt. % of the hydrophobic component.

The mineral supplement may be combined with bulk feed to produce a mineral supplemented animal feed. Typically, the mineral supplement is included in the animal feed as a pellet. In one embodiment, the mineral supplement may be substantially free of any animal byproducts (e.g., animal tallow, etc.).

The mineral supplement may be made using any of a number of conventional processes and pelleting equipment. It should be appreciated that the term pellet may refer to a product made using a pellet mill or the like. In one embodiment, the mineral supplement is a pellet. It should be understood that use of the term "pellet" is not meant to imply or require that any particular process be used to prepare the mineral supplement. Rather, "pellet" is intended to refer to the final solid conglomerated form of the mineral supplement. In one embodiment, the starting materials may be combined together to form a supplement blend. The supplemental blend is passed through a conventional pellet mill to form pelletized mineral supplements. In one embodiment, the mineral supplement may be made without conditioning the supplement blend by, inter alia, heating, exposing to steam, and the like. In another embodiment, the supplement blend may be conditioned and/or water may be added. Commonly, however, the pellets are formed without exposing the feed mix introduced into the pellet mill to any source of additional water (e.g., process steam).

DETAILED DESCRIPTION

The mineral supplements described herein are useful as a supplement in feed applications such as animal feed. The mineral supplement may include an ingredient component at elevated levels. The mineral supplement may also include a hydrophobic component. The mineral supplement may also include one or more materials that function as a heat sink during the pelleting process. The materials that function as the heat sink may include materials that make up the hydrophobic component and/or the ingredient component.

As mentioned previously, the ingredient component of the mineral supplement refers to combination of the mineral source and the non-protein nitrogen source, if any, that is in the mineral supplement. In one embodiment, the mineral supplement may include an elevated amount of the ingredient component. The amount of the ingredient component in the mineral supplement may vary widely. For example, depending on the embodiment, the mineral supplement may include at least about 50 wt. %, desirably at least about 65 wt. %, suitably at least about 70 wt. %, further, at least about 75 wt. %, or yet even further at least about 80 wt. %, at least about 85 wt. %, at least about 90 wt. %, or at least about 95 wt. % of the ingredient component. In many situations, it is desirable to maximize the amount of the ingredient component in the mineral supplement.

Some of the elemental minerals/mineral compounds that may be provided in the ingredient component are shown in Table 1. Table 1 shows the range that various elemental minerals and/or mineral compounds may commonly be present in the mineral supplement. It should be understood that the ranges are listed as elemental minerals and/or mineral compounds, and the actual amount of the mineral source for the elemental minerals and/or mineral compounds varies depending on the desired concentration of the elemental mineral and/or mineral compound in the supplement and the particular mineral source(s) employed to produce the supplement. Also, the amounts shown in Table 1 represent those amounts of the elemental mineral and/or mineral compound that would be present in the mineral supplement. Thus, the amount of the mineral source used to provide the amount of elemental mineral and/or mineral compound may be higher. While a particular mineral supplement commonly includes more than one of the elemental minerals and/or mineral compound listed in Table 1, it need not and routinely does not include all of the mineral nutrients (elemental mineral and mineral compound) listed in the table.

TABLE 1

| Elemental Mineral/Mineral Compound | Amount |
| --- | --- |
| Calcium | 0.5% to 30% |
| Phosphorous | 0.3% to 16% |
| Salt (Sodium Chloride) | 0.2 to 20% |
| Potassium | 0.1 to 7.5% |
| Magnesium | 0.1 to 7.5% |
| Zinc | 200 to 25,000 mg/lb |
| Iron | 200 to 25,000 mg/lb |
| Copper | 30 to 85,000 mg/lb |
| Cobalt | 2 to 400 mg/lb |
| Iodine | 5 to 1500 mg/lb |
| Manganese | 200 to 25,000 mg/lb |
| Selenium | 1 to 400 ppm |

As shown in Table 1, the ingredient component may include sources of major minerals such as calcium, phosphorous, salt, potassium, and magnesium as well as sources for trace minerals such Zinc, Iron, Copper, Cobalt, Iodine, Manganese, Molybdenum, and Selenium. In one embodiment, the mineral supplement may include no more than about 5 wt. % of trace minerals. It should be understood, that an individual mineral source may serve as a source for one or more elemental minerals and/or mineral compounds listed in Table 1.

The elemental minerals and/or mineral compounds may be provided using any of a number of mineral sources. In general, any GRAS (generally recognized as safe) mineral source may be used which provides a bioavailable mineral. Table 2 shows some examples of suitable mineral sources.

TABLE 2

| GRAS Mineral Sources |
| --- |
| Calcium Acetate |
| Calcium Carbonate |
| Calcium Chloride |
| Calcium Gluconate |
| Calcium Hydroxide |
| Calcium Iodate |
| Calcium Iodobehenate |
| Calcium Oxide |
| Calcium Sulfate (anhydrous or dihydrate) |
| Cobalt Acetate |
| Cobalt Carbonate |
| Cobalt Chloride |
| Cobalt Oxide |
| Cobalt Sulfate |
| Copper Carbonate |
| Copper Chloride |
| Copper Gluconate |
| Copper Hydroxide |
| Copper Orthophosphate |

TABLE 2-continued

GRAS Mineral Sources

Copper Oxide
Copper Pyrophosphate
Copper Sulfate
Cuprous Iodide
Dicalcium Phosphate
Diiodosalicylic Acid
Disodium Phosphate
Ethylenediamine Dihydroiodide
Ferrous Fumarate
Iron Ammonium Citrate
Iron Carbonate
Iron Chloride
Iron Gluconate
Iron Oxide
Iron Phosphate
Iron Pyrophosphate
Iron Sulfate
Reduced Iron
Magnesium Acetate
Magnesium Carbonate
Magnesium Oxide
Magnesium Sulfate
Manganese Acetate
Manganese Carbonate
Manganese Chloride
Manganese Citrate (soluble)
Manganese Gluconate
Manganese Orthophosphate
Manganese Oxide
Manganese Phosphate (dibasic)
Manganese Sulfate
Monocalcium Phosphate
Monosodium Phosphate
Potassium Acetate
Potassium Bicarbonate
Potassium Carbonate
Potassium Chloride
Potassium Iodate
Potassium Iodide
Potassium Sulfate
Sodium Acetate
Sodium Chloride
Sodium Bicarbonate
Sodium Iodate
Sodium Iodide
Sodium Sulfate
Sodium Tripolyphosphate
Sulfur
Thymol Iodide
Tricalcium Phosphate
Zinc Acetate
Zinc Carbonate
Zinc Chloride
Zinc Oxide
Zinc Sulfate In one embodiment, the ingredient component may include a calcium source and salt (i.e., sodium chloride). In another embodiment, the ingredient component includes a source of at least one of calcium, sodium, potassium, phosphate, sulfur, or magnesium. It should be appreciated that in other embodiments, the ingredient component may include any combination of the mineral sources shown above with any combination of non-protein nitrogen sources described herein.

The composition of the ingredient component may be varied in a number of ways. For example, in one embodiment, the ingredient component may include one or more mineral sources without a non-protein nitrogen source. In another embodiment, the ingredient component may include no more than about 50 wt. % non-protein nitrogen source, desirably no more than about 40 wt. % non-protein nitrogen source, or suitably no more than about 35 wt % non-protein nitrogen source. In another embodiment, the ingredient component includes about 5 to about 50 wt. % non-protein nitrogen source, about 10 to about 45 wt. % non-protein nitrogen source, desirably about 20 to about 40 wt. % non-protein nitrogen source, or suitably about 25 to about 35 wt. % non-protein nitrogen source. Thus, the ingredient component may include at least about 50 wt. % or desirably at least about 60 wt. % of the mineral source.

The composition of the mineral supplement may likewise vary based on the composition and inclusion level of the ingredient component. In one embodiment, the mineral supplement may include about 25 to 85 wt. %, about 30 to 80 wt. %, desirably about 40 to 75 wt. %, or suitably about 50 to 65 wt. % of the mineral source and about 2 to 55 wt. %, desirably about 5 to 50 wt. %, or suitably about 15 to 40 wt. % of the non-protein nitrogen source. In another embodiment, the mineral supplement may include at least about 1 wt. %, desirably at least about 2 wt. %, or suitably at least about 5 wt. % of the non-protein nitrogen source. In another embodiment, the mineral supplement may include between about 0 to 40 wt. %, desirably 1 to 30 wt. %, or suitably 3 to 20 wt. % of the non-protein nitrogen source. In yet another embodiment, the mineral supplement may include at least about 50 wt. %, at least about 60 wt. %, desirably, at least about 65 wt. %, or suitably at least about 70 wt. % of the mineral source.

A non-protein nitrogen source may be included in the mineral supplement. In addition to excluding protein based nitrogen sources, the term "non-protein nitrogen source," as used herein, is also meant to exclude amino acid based nitrogen sources. The non-protein nitrogen source may include organic nitrogen sources and/or inorganic nitrogen sources. For example, organic nitrogen sources may include urea, uric acid, and/or biuret. Another suitable nitrogen source may include ammonium salts such as ammonium acetate and inorganic ammonium salts such as ammonium sulfate, ammonium chloride, ammonium polyphosphate, diammonium phosphate, monoammonium phosphate, and the like. The urea may be obtained from any of a number of suitable sources and in any of a number of suitable forms. For example, the urea may be microprilled or rolled urea.

The mineral supplement may include a hydrophobic component. The hydrophobic component may include any of a number of suitable materials. The hydrophobic component may be a blend of materials or may be a single material such as a fully hydrogenated oil (e.g., soybean, etc.). In many instances, at least a portion of the hydrophobic component will also function as a heat sink material, lubricant, and/or aid in binding the mineral supplement together after it is cooled to ambient temperature. In one embodiment the hydrophobic component may have a melting point of at least about 50° C., desirably at least about 55° C., or suitably at least about 60° C. In some instances, the hydrophobic component may have a melting point of at least about 65° C.

In one embodiment, the hydrophobic component may include fatty acid material such as free fatty acids (e.g., saturated free fatty acids having 12-22 carbon atoms) and divalent salts of long chain fatty acids (e.g., palmitic acid, stearic acid) such as zinc fatty acid salts, magnesium fatty acid salts, and/or calcium fatty acid salts. The hydrophobic component may also include fully hydrogenated soybean oil, fully hydrogenated vegetable oil, animal fat, vegetable fat, vegetable wax, animal tallow, or a mixture thereof.

In another embodiment, the hydrophobic component may also include a high melting hydrophobic substance (HMHPS) and a second substance such as a lubricant which has a lower melting point. For example, the HMHPS may have a melting point that is at least about 55° C., at least about 60° C. or desirably at least about 65° C. and the second substance may have a melting point that is no more than about 55° C. or desirably no more than about 50° C. The HMHPS may be any of a number of suitable materials such as hydrogenated vegetable oil (fully or hydrogenated to desired melting point), saturated free fatty acids and their salts (e.g., zinc salts), etc. The second substance may be animal tallow, and the like.

The mineral supplement may include at least about 1 wt. %, at least about 1.5 wt. %, at least about 2 wt. %, or at least about 2.5 wt. % of the hydrophobic component. In another embodiment, the mineral supplement may include about 1 wt. % to 10 wt. %, about 1.5 wt. % to 8 wt. %, about 2 wt. % to 5 wt. % of the hydrophobic component. The mineral supplement may also include at least about 0.5 wt. %, at least about 1 wt. %, at least about 1.5 wt. %, or at least about 2 wt. % of the HMHPS. In another embodiment, the mineral supplement may include about 0.5 to 6 wt. %, about 1 to 4 wt. %, or about 2 to 3 wt. % of the HMHPS. The ratio of HMHPS to lubricant in the hydrophobic component may be anywhere from 10:1 to 1:4.

The mineral supplement may include any of a number of suitable heat sink materials. In general, the heat sink should be edible and, desirably, palatable to the target animal. Also, the heat sink material should have physical properties that allow it to absorb a sufficient quantity of heat to facilitate pelleting of the mineral supplement (e.g., undergo a phase change at the processing temperatures). As explained previously, the heat sink materials may include materials from the ingredient component (e.g., urea), the hydrophobic component (e.g., HMHPS), or other components that are included in the mineral supplement.

In one embodiment, suitable materials that may act as a heat sink during pelleting include edible materials that have a melting point of about 50° C. to 200° C., or desirably about 60° C. to 150° C., and/or dehydrates at about 50° C. to 200° C., or desirably about 60° C. to 150° C. Examples of materials that may be used as the heat sink include, but are not limited to mono- and di-saccharides such as sucrose and the like, hydrated forms of divalent salts of organic acids such as divalent salts of acetic acid (e.g., sodium acetate trihydrate, magnesium acetate tetrahydrate, calcium acetate monohydrate, and the like), urea, HMHPS and the like. For example, sodium acetate trihydrate melts at 58° C. and becomes anhydrous when heated to about 120° C. Such materials, when included in the supplement blend can serve to absorb the heat which may be generated from friction as the supplement blend passes through the pelleting equipment. It is believed as a result of the heat required to melt and/or dehydrate such a material the overall temperature rise in the supplement blend is lessened.

The amount of the heat sink material in the mineral supplement may vary according to the inclusion levels of the other components. In one embodiment, the mineral supplement includes at least about 1 wt. %, at least about 2 wt. %, at least about 5 wt. %, at least about 7 wt. %, or at least about 10 wt. % of heat sink material. In another embodiment, the mineral supplement may include about 1 wt. % to 20 wt. %, about 2 wt. % to 18 wt. %, about 3 wt. % to about 15 wt. %, about 5 wt. % to 12 wt. % of the heat sink material.

A filler may also be included in the mineral supplement. The amount of filler in the mineral supplement may vary widely. However, because it is desirable to increase the amount of the ingredient component, it is generally desirable to minimize the amount of filler in the mineral supplement. The filler may be any edible GRAS material. Suitable fillers include: corn gluten feed, sunflower hulls, distillers grains, guar hulls, wheat middlings, rice hulls, rice bran, oilseed meals (e.g., cottonseed, soybean, sunflower, linseed, peanut, rapeseed, canola, etc.), dried blood meal, animal by-product meal, fish by-product, fish meal, dried fish solubles, feather meal, poultry by-products, meat meal, bone meal, dried whey, soy protein concentrate, soy flour, yeast, wheat, oats, grain sorghums, corn feed meal, rye, corn, barley, aspirated grain fractions, brewers dried grains, corn flour, corn gluten meal, feeding oat meal, sorghum grain flour, wheat mill run, wheat red dog, hominy feed, wheat flour, wheat bran, wheat germ meal, oat groats, rye middlings, cotyledon fiber, ground grains (e.g., wheat, corn, milo, etc.), or a mixture thereof. Numerous additional fillers may also be used.

The amount of filler in the mineral supplement depends on the amount of the ingredient component and the other components in the mineral supplement. In one embodiment, the mineral supplement includes no more than about 20 wt. %, desirably no more than about 15 wt. %, suitably no more than about 10 wt. %, or still further no more than about 8 wt. % of the filler.

A binder may also be used to facilitate increased pellet quality. Suitable binders may include bentonite, lignin sulfonate, sodium silicate and various gums, attapulgite clay, calcium aluminates, dried or wet molasses, or a mixture thereof. The mineral supplement may also include a binder such as those commonly used in pelleting and/or extrusion processes. Also, the mineral supplement may include amino acids, enzymes, dyes, vitamins such as Vitamin A, D-3, E, K, and B-12, niacin, riboflavin, pantothenic acid, biotin, folic acid, thiamine, pyridoxine, and choline. In one embodiment, the mineral supplement includes no more than about 4 wt. % binder, 3 wt. % binder, or desirably no more than about 1 wt. % binder. In another embodiment, the mineral supplement may include between about 1 wt. % to 4 wt. % or about 1.5 wt. % to 3 wt. % binder.

Miscellaneous other materials may also be included in the mineral supplement as an aid in forming and processing the supplement blend into the mineral supplement or to target a specific nutritional/health need of the animal. For example, calcium hydroxide may be added to the supplement blend to aid processing and forming of the mineral supplement.

A method for making the mineral supplement is described. The ingredient component and the hydrophobic component may be combined together to form a supplemental blend. The supplement blend may be a variety of dry and/or wet materials used to make the mineral component. The supplement blend may be further processed to form the mineral supplement by forcing the supplemental blend through an orifice and dividing it into pellets. This may be done, for example, by either an extrusion process or a pelletizing process. The mineral supplement may then be cooled and/or dried.

As the supplement blend passes through the pelletizer, it is believed that the heat sink material (e.g., HMHPS, urea, etc.) absorbs some of the heat from the process as it melts, softens, or is otherwise heated. The heat sink material may have a melting point that is no more than about 200° C., desirably no more than about 160° C., or suitably no more than about 150° C. to more readily absorb significant amounts of the heat generated by the process.

The hydrophobic component, when used, may be combined with the supplement blend in a variety of ways. For example the HMHPS may be added to the supplement blend as a solid while the lubricant may be combined with the supplement blend as a liquid. In other embodiments, both the HMHPS and the lubricant may be provided in liquid form to the supplemental blend. Table 3 shows some examples of HMHPSs along with their melting points and the melting point of some combinations of an HMHPS and animal tallow (at a 3/2 wt. ratio). It should be understood that the stearic acid referred to in Table 3 is commercial grade stearic acid as opposed to pure stearic acid. Commercial grade stearic acid may include significant amounts of other fatty acids (e.g., palmitic acid). For example, commercial grade stearic acid may include about 50 to about 60 wt. % stearic acid, 25 to about 35 wt. % palmitic acid, and about 10 to about 15 wt. % other fatty acids. Other embodiments of commercial stearic acid may include other varying amounts of fatty acids. References to stearic acid herein should be understood to refer to commercial grade stearic acid unless noted otherwise.

TABLE 3

| HMHPS | Melting Point (° C.) | Melting Point (° C.) of 3/2 Wt. Ratio of Animal Tallow to First Component |
|---|---|---|
| Animal Tallow (Reference material) | 46 | — |
| Stearic Acid | 68 | 62 |
| Vegetable Wax | 66 | 63 |
| Stable Flake (hydrogenated vegetable oil) | 67 | 57 |
| Zinc Stearate | 121 | 74 |
| Fully Hydrogenated Soybean Oil | Circa 65 | |

The size of the pellet may be varied to suit the particular situation. Typically, the size of mineral supplement pellet is sufficient to allow it to be added and mixed with animal feed. In one embodiment, the average weight of the pellets may be about 250 mg to about 500 mg or desirably 325 mg to about 425 mg. The diameter of the pellet may be between about 1 mm and about 20 mm, desirably between about 2 mm and 8 mm, or suitably between about 3 mm and 6 mm. The pellets may be any suitable length but suitably may have a roughly cylindrical shape with a length that is about 1 to 5 times the cylinder diameter. The density of the pellet may be between 35 to 55 lb/ft$^3$ or 40 to 50 lb/ft$^3$.

The mineral supplement pellet may be combined with an animal feed. In one embodiment, the animal feed may comprise between about 0.5 wt. % to about 5 wt. % or desirably about 1.5 to about 3 wt. % of the mineral supplement. In one embodiment, the animal feed may be subjected to additional processing (e.g., cubing of the animal feed, etc.).

In one embodiment, the mineral supplement may be prepared by feeding the supplement blend through a conventional pelleting mill without exposing the supplement blend to steam or otherwise conditioning (e.g., heating, etc.) the supplement blend. Although not wishing to be bound by theory, it is believed that the addition of the steam may cause the materials included in the mineral supplement to interact with each other in a manner that may impede the supplement blend from passing through the pellet mill. Of course, whether the materials interact adversely depends on the particular materials being used. Thus, in other embodiments, steam and/or other conditioning measures may be used. In another embodiment, the supplement blend may be combined with water and other liquids such as liquid nutrient additives (e.g., vitamins, enzymes included in a liquid carrier, etc.). The liquids may be combined with the supplement blend at ambient temperature.

The pelletized mineral supplement desirably has a pellet durability index (PDI) of at least about 50%, at least about 60%, at least about 75%, desirably at least about 80%, suitably at least about 85%, or at least about 90%. The PDI may be determined using the procedure referred to in U.S. Published Patent Application No. 2003/0170371, entitled "High Fat/Fiber Composition," filed on Dec. 3, 2002, at paragraphs 18-24 and Table 1, the disclosure of which is hereby incorporated herein by reference.

Alternatively, the pelletized mineral supplement may have a pellet hardness index (PHI) of at least about 100 g/mm, desirably at least about 150 g/mm, suitably at least about 200 g/mm, and further at least about 300 g/mm. The PHI may be determined using five good pellets from a sample of the pellets that are made. The five pellets should represent the sample, so typically 2 longs pellets, 2 medium sized pellets, and 1 small pellet are chosen as part of the sample. A force gauge (e.g., 2 kg force gauge) is used to determine the force required to break the pellet. The length of each pellet is measured. The pellet is positioned lengthwise in the force gauge so that the pellet is lying horizontally. Thus, the force gauge contacts the longitudinal side of the pellet. Force is applied to the pellet to determine the force necessary to break the pellet. The PHI is the average amount of force per unit of length of the pellets that is required to break the pellets.

Alternatively, the fines content produced in pelleting the mineral supplement may be no more than about 20%, desirably no more than about 15%, suitably no more than about 10%, or further no more than about 5%. The fines content may be determined by removing samples from the die and/or cooler of the pellet mill. The samples are sieved using the appropriate sieve as determined using Table 1 from U.S. Published Patent Application No. 2003/0170371, referenced above. The percent of the material that passes through the sieve is the fines content of the sample.

Example 1

Various samples of a mineral supplement were prepared according to the following procedures. The composition of samples A-S is shown in Table 4. The composition of the ingredient component employed to produce each of these mineral supplements is shown in Table 5. The mineral premix includes trace minerals in small amounts. The MagOx-54 is largely magnesium oxide (90-96 wt. %) that contains 54 wt. % elemental Mg. Also, it should be noted that the Mix 1 referred to in samples F and J in Table 4 is 75 wt. % palm stearin, 24.5 wt. % stearic acid, and 0.5 wt. % lecithin.

TABLE 4

| Sample | Ingredient Component From Table 5 | Hydrophobic Component | | |
|---|---|---|---|---|
| | | HMHPS | Second Component | Filler |
| A | 88 | 2% Stearic Acid | 3% Animal Tallow | 7% Wheat Midds |
| B | 85 | 2% Stearic Acid | 6% Animal Tallow | 7% Wheat Midds |
| C | 88 | 2% Stearic Acid | 3% Animal Tallow | 7% Wheat Midds |
| D | 85 | 2% Stearic Acid | 6% Animal Tallow | 7% Wheat Midds |
| E | 91 | 2% Stearic Acid | 0 | 7% Wheat Midds |

TABLE 4-continued

| Sample | Ingredient Component From Table 5 | Hydrophobic Component HMHPS | Second Component | Filler |
|---|---|---|---|---|
| F | 88 | 2% Mix 1 | 3% Animal Tallow | 7% Wheat Midds |
| G | 88 | 2% Fully Hydrogenated Soybean Oil | 3% Animal Tallow | 7% Wheat Midds |
| H | 88 | 2% Vegetable Wax | 3% Animal Tallow | 7% Wheat Midds |
| I | 88 | 2% Zinc Stearate | 3% Animal Tallow | 7% Wheat Midds |
| J | 85 | 2% Mix 1 | 6% Animal Tallow | 7% Wheat Midds |
| K | 85 | 2% Fully Hydrogenated Soybean Oil | 6% Animal Tallow | 7% Wheat Midds |
| L | 85 | 2% Vegetable Wax | 6% Animal Tallow | 7% Wheat Midds |
| M | 85 | 2% Zinc Stearate | 6% Animal Tallow | 7% Wheat Midds |
| N | 85 | 2% Stearic Acid | 3% Animal Tallow | 7% Wheat Midds |
| O | 88 | 2% Stearic Acid | 6% Animal Tallow | 7% Wheat Midds |
| P | 88 | 2% Stearic Acid | 3% Animal Tallow | 7% Dried Distillers Grains |
| Q | 88 | 2% Stearic Acid | 3% Animal Tallow | 7% Soy Hulls |
| R | 85 | 2% Stearic Acid | 6% Animal Tallow | 7% Dried Distillers Grains |
| S | 85 | 2% Stearic Acid | 6% Animal Tallow | 7% Soy Hulls |

For each sample, 50 lbs of a supplement blend was prepared. Samples A-B, F-M, and P-S were prepared by placing the ingredient component, the HMHPS, and the filler into a mixer. Each of these materials was placed in the mixture at ambient temperature and in a solid state. The mixture was mixed using a conventional Hobart® mixer until the materials were uniformly dispersed. Once the materials were mixed, liquid animal tallow that was heated to about 54° C. was sprayed onto the other dispersed ingredients and mixed in to prepare the supplement blend.

TABLE 5

| Component | Percent |
|---|---|
| Calcium Carbonate | 50.7 |
| Urea | 34.47 |
| DiCalcium Phosphate | 7.18 |
| Salt (NaCl) | 4.11 |
| Trace Mineral Premix | 1.88 |
| MagOx-54 | 1.65 |
| Total | 100 |

Scoops of the supplement blend were placed in the inlet of the pellet mill at regular intervals to provide a constant flow of the supplement blend into the pellet mill. The pellet mill was a Century® model made by California Pellet Mill. The die used on the pellet mill had a 40.6 cm outside diameter, 2040 hole count (10 per row, 204 rows), 12.1 cm wide die face, 167.6 cm outside linear length, 0.4 cm×6.35 cm×1.9 cm variable relief, and an effective die thickness of 4.4 cm.

About halfway through each run, a sample of the pellets was obtained in a Styrofoam cup and sealed with a lid. A thermocouple was positioned through the lid and used to measure the temperature of the pellets. At the end of each run, the die temperature was measured using an infrared sensor. The temperature of the pellets and the die are shown in Table 6.

Samples C-D and N-O were prepared according to a similar procedure as described for the other samples. However, for samples C-D, the HMHPS and the animal tallow were melted together and added as a liquid to the mix of dry materials, and, for samples N-O, the supplement blend was heated to 54° C. after the liquid animal tallow was added.

TABLE 6

| | | Temp Profile (° C.) | | | | | | |
|---|---|---|---|---|---|---|---|---|
| Sample | Amps | Supp. blend Temp | Pellet Temp | Die Temp | ΔT | PHI (g/mm) | PDI % | Fines % |
| A | 90-100 | 21 | 60.6 | 65.6 | 5 | 189 | 97.4 | 9.5 |
| B | 90 | 21 | 50 | 57.2 | 7.2 | | 98.2 | 5.0 |
| C | 100 | 21 | 57.8 | 67.8 | 10 | 189 | 94.1 | 1.6 |
| D | 80 | 21 | 48.9 | 56.1 | 7.2 | | 99.1 | 22.0 |
| E | 100 | 21 | 66.1 | 87.2 | 21.1 | 399 | 90.6 | 1.8 |
| F | 65 | 21 | 63.3 | 66.1 | 2.8 | 358 | 97.4 | 4.8 |
| G | 80 | 21 | 61.1 | 70.6 | 9.5 | 241 | 94.1 | 1.1 |
| H | 80 | 21 | 63.9 | 70.6 | 6.7 | 271 | 98.4 | 2.1 |
| I | 80 | 21 | 58.3 | 67.2 | 8.9 | 417 | 98.8 | 1.0 |
| J | 75 | 21 | 50.6 | 51.1 | 0.5 | | 98.8 | 9.9 |
| K | 90 | 21 | 50.6 | 55 | 4.4 | | 98.0 | 4.2 |
| L | 95 | 21 | 52.2 | 56.7 | 4.5 | | 98.9 | 7.8 |
| M | 85 | 21 | 45.6 | 61.7 | 16.1 | | 98.1 | 2.7 |
| N | 70 | 21 | 62.8 | 90.6 | | | 95.9 | |
| O | 85 | 21 | 61.1 | 70.6 | 9.5 | | 94.8 | 9.0 |
| P | 80 | 21 | 65 | 71.7 | 6.7 | 263 | 95.9 | 3.3 |
| Q | 90 | 21 | 62.8 | 70 | 7.2 | 246 | 94.6 | 2.1 |
| R | 90 | 21 | 51.7 | 57.8 | 6.1 | | 97.4 | 14.2 |
| S | 85 | 21 | 51.7 | 63.9 | 6.1 | | 95.4 | 18.1 |

The samples obtained for each run are shown in Table 6. For each sample, the PHI, PDI, and fines content were measured. The fines content refers to the percentage of material from each sample of the mineral supplement that passes through a J screen, which has 5/32" round openings. The fines content was measured at the die. Also, the difference in temperature between the pelleted mineral supplement (as measured in the mid-run sample collected in the Styrofoam cup) and the die was calculated (ΔT in Table 6). The temperature difference may provide a rough indication of whether the die is being unduly heated due to friction which may cause scoring and/or heat the die above its maximum allowable operating temperature (typically between about 95° C. and 105° C.). The temperature difference between the die and the pelleted material may vary substantially depending on the size and type of the pellet mill used. Also, the maximum allowable operating temperature may also vary substantially depending on the pellet mill.

The PHI, PDI, and fines content are parameters which may be used to characterize the physical properties of the pellet. In general, it is desirable to increase the PHI and PDI and decrease the fines content to provide pellets with desirable physical properties and handling characteristics.

Example 2

A mineral supplement pellet was prepared using substantially the same procedure described above for sample A in Example 1. The mineral supplement pellet had the composition shown in Table 7.

TABLE 7

| | Amount (lbs) | Percent % |
|---|---|---|
| Calcium Carbonate | 157.5 | 45 |
| Urea | 87.5 | 25 |
| Salt (NaCl) | 35 | 10 |
| Corn/Coarse Cracked | 24.5 | 7 |
| Animal Fat Blend | 21 | 6 |
| KCl-50 | 17.5 | 5 |
| Stearic Acid | 7 | 2 |
| Total | 350 | 100 |

Example 3

Mineral supplement pellets can be prepared on a commercial pellet mill capable of producing up to 8-10 tons/hour of pelleted materials using substantially the same procedure described above for sample A in Example 1. For example, such a process can be employed to produce pelleted mineral supplements having the compositions shown in Tables 8, 9 and 10.

TABLE 8

| | Amount (lbs) | Percent % |
|---|---|---|
| Calcium Carbonate | 9,000 | 45 |
| Urea | 6,000 | 30 |
| Dicalcium Phosphate | 1,400 | 7 |
| Salt (NaCl) | 800 | 4 |
| Mg Oxide | 400 | 2 |
| Soy Hulls | 1,400 | 7 |
| Animal Fat Blend (Tallow) | 600 | 3 |
| Stearic Acid | 400 | 2 |
| Lignin Sulfonate Binder | 200 | 1 |
| Total | 20,000 | 100 |

TABLE 9

| | Amount (lbs) | Percent % |
|---|---|---|
| Calcium Carbonate | 10,000 | 50 |
| Urea | 5,000 | 25 |
| Dicalcium Phosphate | 1,400 | 7 |
| Salt (NaCl) | 1,200 | 6 |
| Wheat Middlings | 1,400 | 7 |
| Animal Fat Blend (Tallow) | 600 | 3 |
| Hydrogenated Soybean Oil | 400 | 2 |
| Total | 20,000 | 100 |

TABLE 10

| | Amount (lbs) | Percent % |
|---|---|---|
| Calcium Carbonate | 9,000 | 45 |
| Urea | 5,000 | 25 |
| Dicalcium Phosphate | 1,400 | 7 |
| Salt (NaCl) | 2,000 | 10 |
| Dried Distillers Grains | 1,500 | 7.5 |
| Animal Fat Blend (Tallow) | 600 | 3 |
| Palm Stearin/Stearic Acid (75/25) | 400 | 2 |
| Bentonite Binder | 100 | 0.5 |
| Total | 20,000 | 100 |

TABLE 10-continued

Example 4

Three tons of supplement blend was prepared using substantially the same procedure described above for sample A in Example 1. The supplement blend was passed through a commercial pellet mill capable of producing up to 9 tons/hour of pelleted material. The pelletizer had a 4.4 mm die with a 2.54 cm effective thickness. The composition of the mineral supplement that was prepared is shown in Table 11. The PDI for the pellets ranged from about 53 to about 62% and the fines content was about 19.5% at the die and about 13.7% at the cooler.

TABLE 11

| Component | Percent |
|---|---|
| Calcium Carbonate | 43.1 |
| Urea | 29.3 |
| DiCalcium & MonoCalcium Phosphate | 6.1 |
| Salt (NaCl) | 3.5 |
| Animal Tallow | 3 |
| Stearic Acid | 2 |
| Trace Mineral Premix | 1.6 |
| MagOx-54 | 1.4 |
| Lignin Sulfonate | 0.5 |
| Dye | 0.05 |
| Total | 100 |

Example 5

Mineral supplement pellets having the compositions shown in Tables 13-16 were made according to the following process. Table 12 shows common ranges for some of the more widely used components in the mineral supplement. The process described in this example may be used to prepare mineral supplements having compositions within the range shown in Table 12. The process may also be used to prepare mineral supplements having compositions outside the ranges shown in Table 12.

The mineral supplement is made using commercial feed manufacturing equipment. The equipment is used to mix and pellet the supplement blend to form the pelleted mineral supplement. The mixing process is performed by weighing the desired amounts of the lubricant and the HMHPS. These components are weighed on a small platform scale and put into a container until later in the mixing process. The bulk ingredients (calcium, urea, salt, etc.) are weighed on a large ingredient scale. The weighed amounts of the lubricant, HMHPS, and bulk ingredients are then discharged into a horizontal ribbon mixer where they are mixed. After mixing has begun, any liquid ingredients are introduced into the mixer and the total batch is mixed for an additional time period adequate to provide a homogenous mixture.

TABLE 12

| Component | Exemplary Percent Range |
|---|---|
| Calcium Carbonate | 0-80 |
| Dolomitic Limestone | 0-40 |
| Salt | 0-20 |
| Potassium Source | 0-15 |
| Magnesium Source | 0-15 |
| Ammonium Salts | 0-15 |
| Urea | 0-50 |
| Wheat Midds | 0-20 |
| Lubricant | 0.5-3 |
| HMHPS (High Melting Hydrophobic Substance) | 1-3 |
| Binder | 0-3 |
| Total | 100 |

Once a homogenous mixture has been formed, it is discharged from the mixer and conveyed to a holding bin above the pelleting equipment. The blended supplement is conveyed in a controlled fashion to the pelleting equipment using a feeder auger. The feeder auger delivers the blended supplement to the conditioner. Steam may be added at the conditioner, but in the present examples, no steam is added. The blended supplement is conveyed through the conditioner to the feed chute, which delivers the product into the pellet chamber of the pellet mill. In the chamber portion of the pellet mill, the supplement blend is compressed and forced through an orifice. This process forms the pelleted mineral supplement. A California Pellet Mill brand pellet mill is used in this process.

Upon being discharged from the die of the pellet mill, the pellets drop through a spout and into a commercial pellet cooler. The pellet coolers used are California Pellet Mills counterflow coolers, which has a horizontal bed which holds the pellets discharged from the pellet mills. The design of the coolers allows air to be drawn through the bed of pellets inside the coolers. The level of the pellets is maintained at a fixed level, which allows the pellets to be retained in the cooler until they have reached a cooled temperature relatively close to the ambient temperature of the air being drawn through the cooler. When the level of the pellets in the cooler reaches a predetermined level, the pellet cooler discharges for a time until the pellets drop below a predetermined level, then stops discharging. This allows the continuous flow of the pellets from the pellet mill to be retained for a period of time adequate to remove heat from the pellets that is created through the process of pressing the mixture through the metal die, which creates frictional heat in the pellets.

As the pellets discharge from the cooler, they drop into a hopper below the cooler, where they are conveyed to a distributor, which is used to select which bulk bin the feed is delivered for storage until the feed is ready to be loaded onto trucks for delivery. As the feed drops from the discharge point of the bucket elevator through a spout down to the distributor, a coating agent consisting of very fine calcium is pneumatically blown onto the pellets to coat the pellets with the calcium which helps prevent the pellets from packing together. This allows for improved flowability of the pellets through the loadout bin and the product handling facilities.

TABLE 13

| Component | Percent |
|---|---|
| Mineral Source ($CaCO_3$, NaCl, Zn, K, trace minerals) | 77.93 |
| Urea | 5.00 |
| Wheat Midds | 11.49 |

TABLE 13-continued

| Component | Percent |
|---|---|
| Thiamine Mono | 0.08 |
| Lubricant-Choice White Grease | 1.00 |
| Hydrogenated Vegetable Oil (MP about 65 C.) | 2.00 |
| Lignin Sulfonate (Ameri-Bond 2X) | 2.50 |
| Total | 100 |

TABLE 14

| Component | Percent |
|---|---|
| Mineral Source ($CaCO_3$, NaCl, Zn, K, trace minerals) | 47.15 |
| Urea | 28.91 |
| Wheat Midds | 14.61 |
| Ammonium Sulfate | 3.33 |
| Lubricant-Choice White Grease | 2.00 |
| Hydrogenated Vegetable Oil (MP about 65 C.) | 2.50 |
| Lignin Sulfonate (Ameri-Bond 2X) | 1.50 |
| Total | 100 |

TABLE 15

| Component | Percent |
|---|---|
| Mineral Source ($CaCO_3$, NaCl, Zn, K, trace minerals) | 59.49 |
| Urea | 21.10 |
| Wheat Midds | 13.24 |
| Vitamins | 0.2 |
| Estrus Suppressor (prevent heifers from going into heat) | 0.28 |
| Antibiotic | 0.11 |
| Lubricant-Choice White Grease | 1.00 |
| Hydrogenated Vegetable Oil (MP about 65 C.) | 2.50 |
| Lignin Sulfonate (Ameri-Bond 2X) | 1.67 |
| Antiprotozoal agent | 0.41 |
| Total | 100 |

TABLE 16

| Component | Percent |
|---|---|
| Mineral Source ($CaCO_3$, NaCl, Zn, K, trace minerals) | 75.17 |
| Wheat Midds | 11.83 |
| Ammonium Sulfate | 7.00 |
| Lubricant-Choice White Grease | 2.00 |
| Hydrogenated Vegetable Oil (MP about 65 C.) | 4.00 |
| Total | 100 |

Example 6

Mineral supplement pellets having the compositions shown in Table 17 were made according to the following process. For each one of samples T-Z and A-C, the amount of supplement blend shown in Table 17 was prepared (e.g., 350 lbs, 280 lbs, etc.). The samples were prepared by placing the base mix and the other ingredients into a mixer. Each of these materials was placed in the mixture at ambient temperature and in a solid state. The mixture was mixed using a conventional ribbon blender until the materials were uniformly dispersed.

The mix was pelleted without steam in the conditioner on a Century® model pellet mill made by California Pellet Mill. The die used on the pellet mill had a 40.6 cm outside diameter, 2040 hole count (10 per row, 204 rows), 12.1 cm wide die face, 167.6 cm outside linear length, 0.4 cm×6.35 cm×1.9 cm variable relief, and an effective die thickness of 4.4 cm. At the end of each run, the die temperature was measured using an infrared sensor. Tests were also run to determine the PDI and % Breakage for some of the resulting pellets (N/M in Table 17 means not measured). The results of the tests are shown in Table 17 below. It should be noted that pelleting of samples A and B was stopped prematurely due high amperage load, high temp, and low throughput of the samples through the pelleting equipment. It is believed that this may have been caused by adverse ambient conditions (e.g., high temp, circa 95° F. and 95% humidity) and that under more favorable ambient conditions (e.g., less than about 85° F. and lower than 60% humidity) and/or with adjustments in the operating parameters these samples may be pelleted successfully.

According to another embodiment, a pelleted mineral supplement comprises: at least about 75 wt. % of a combination of a mineral source and optionally a non-protein nitrogen source; wherein the supplement has a PDI of at least about 80%. The pelleted mineral supplement may comprise a non-protein nitrogen source which includes urea. The pelleted mineral supplement may further comprise at least about 2 wt. % of a hydrophobic component. The pelleted mineral supplement may further comprise a high melting hydrophobic substance having a melting point of at least about 55° C. The high melting hydrophobic substance comprises hydrogenated vegetable oil, animal fat, free fatty acid material, fatty acid zinc salt, or a mixture thereof. The pelleted mineral supplement may further comprise a binder.

TABLE 17

| Ingredient | Base Mix | T | U | V | W | X | Y | Z | A | B | C |
|---|---|---|---|---|---|---|---|---|---|---|---|
| Urea | — | 5 | — | — | 15 | 15 | 5 | 5 | — | 5 | — |
| Ammonium Sulphate | — | — | 7 | — | — | — | — | — | — | — | — |
| Hydrated Sodium Acetate (e.g., Sodium Acetate Trihydrate) | — | — | — | 7 | 15 | 15 | 5 | 5 | 5 | — | 10 |
| Stearic Acid | — | 2.5 | 2.5 | 2.5 | — | — | — | — | — | — | — |
| Sugar | — | — | — | — | 2 | 4 | 2 | 4 | 4 | 4 | 4 |
| Hydrated CaOH2 | — | — | — | — | 1 | 1 | 1 | 1 | 1 | 1 | 1 |
| lignin Sulfonate Binder | — | 1.5 | 1.5 | 1.5 | 1.5 | 1.5 | 1.5 | 1.5 | 1.5 | 1.5 | 1.5 |
| Calcium Carbonate | 57.35 | — | — | — | — | — | — | — | — | — | — |
| Wheat Midds 27-34% NDF | 14.08 | — | — | — | — | — | — | — | — | — | — |
| Salt | 11.9 | — | — | — | — | — | — | — | — | — | — |
| KCl-50 | 14.29 | — | — | — | — | — | — | — | — | — | — |
| Fat Animal Blend | 2.38 | — | — | — | — | — | — | — | — | — | 1.5 |
| Base Mix | — | 91 | 89 | 89 | 65.5 | 63.5 | 85.5 | 83.5 | 88.5 | 88.5 | 82 |
| Total | 100 | 100 | 100 | 100 | 100 | 100 | 100 | 100 | 100 | 100 | 100 |
| Run Size, lbs | | 350 | 280 | 290 | 290 | 350 | 350 | 350 | | | 350 |
| Amps Load | | 75 | 110 | 92 | 83 | 78 | 120 | 115 | | | |
| Die Start Temp | | 93 | 120 | 139 | 97 | 129 | 135 | 162 | | | |
| Die End Temp | | 122 | 140 | 144 | 129 | 135 | 162 | 170 | | | |
| Die Friction Δ Temp | | 29 | 20 | 5 | 32 | 6 | 27 | 8 | | | |
| PDI | | 99.0 | 97.0 | 99.5 | N/M | N/M | N/M | N/M | | | 99.5 |
| Breakage | | 93.5 | 92.6 | 67.9 | 61.5 | 72.4 | N/M | N/M | | | |
| Visual Pellet | | well formed | well formed | well formed | well formed | well formed | well formed | well formed | | | well formed |

ILLUSTRATIVE EMBODIMENTS

A number of illustrative embodiments of the subject matter described herein are provided below. The illustrative embodiments should be considered as providing only a select number of illustrative examples many of which may be expanded or modified in numerous ways to provide additional embodiments. Accordingly, the illustrative embodiments should not be considered limiting in any way.

In one embodiment, a pelleted mineral supplement comprises: at least about 50 wt. % of a combination of a mineral source and optionally a non-protein nitrogen source; wherein the supplement comprises at least about 10 wt. % of an edible material that has a melting point of about 50° C. to 200° C. and/or dehydrates at about 50° C. to 200° C. The edible material may have a melting point of about 60° C. to 150° C. and/or dehydrate at about 60° C. to 150° C. The edible material may include, urea, a saccharide, a hydrated sodium organic acid salt, a hydrophobic component, or a mixture thereof. The edible material may include sucrose, sodium acetate trihydrate, or a mixture thereof. The pelleted mineral supplement may comprise at least about 65 wt. % of the combination. The pelleted mineral supplement may comprise the non-protein nitrogen source, wherein the non-protein nitrogen source includes urea, an ammonium salt, or a mixture thereof.

According to another embodiment, a pelleted mineral supplement comprises: at least about 65 wt. % of a combination of a mineral source and urea; and a hydrophobic component. The pelleted mineral supplement may comprise at least about 75 wt. % of the combination. The mineral supplement may comprise at least about 5 wt. % urea. The pelleted mineral supplement may comprise at least about 2 wt. % of the hydrophobic component. The hydrophobic component comprises a high melting hydrophobic substance having a melting point of at least about 55° C. The pelleted mineral supplement may comprise about 1 to 10 wt. % of the hydrophobic component. The hydrophobic component may include fatty acid material having a melting point of at least about 55° C. The hydrophobic component may comprise hydrogenated vegetable oil, animal fat, free fatty acid material, fatty acid zinc salt, or a mixture thereof.

According to another embodiment, a pelleted mineral supplement comprises: at least about 50 wt. % of a combination of a mineral source and optionally a non-protein nitrogen source; and at least about 0.5 wt. % of a high melting hydrophobic substance having a melting point of at least about 55° C. The pelleted mineral supplement may comprise at least about 65 wt. % of the combination. The pelleted mineral supplement may comprise a non-protein nitrogen source which includes urea. The high melting hydrophobic substance includes, hydrogenated vegetable oil, free fatty acid material, fatty acid zinc salt, or a mixture thereof. The pelleted mineral supplement may comprise about 1 to 6 wt. % of the high melting hydrophobic substance. The pelleted mineral supplement may further comprise a binder. The pelleted mineral supplement may comprise about 40 to 90 wt. % of the mineral source; no more than about 50 wt. % of the optional non-protein nitrogen source; and about 3-10 wt. % of a hydrophobic component which includes the high melting hydrophobic substance.

According to another embodiment, a method of producing a pelleted mineral supplement comprises: forming a supplement blend including at least about 50 wt. % of a combination of a mineral source and optionally a non-protein nitrogen source; and at least about 0.5 wt. % of a high melting hydrophobic substance having a melting point of at least about 55° C.; and forcing the supplement blend through an orifice to form a compressed blend. The pelleted mineral supplement may be produced without exposing the supplement blend to steam.

According to another embodiment, pelleted mineral supplement comprises: at least about 70 wt. % of a combination of a mineral source and a non-protein nitrogen source (e.g., urea, ammonium salts, etc.); and a hydrophobic component, which includes high melting hydrophobic substance having a melting point of least about 55° C. The hydrophobic component may comprise animal fat, vegetable fat, or a mixture thereof. The high melting hydrophobic substance may comprise hydrogenated vegetable oil. The high melting hydrophobic substance may comprise fatty acid material having a melting point of at least about 55° C. The hydrophobic component may have an Iodine Value of no more than about 20, or, desirably an Iodine Value of no more than about 10. The hydrophobic component may have a melting point of at least about 60° C., commonly about 60° C. to 75° C. The high melting hydrophobic substance supplement may include saturated fatty acids having 14 to 20 carbon atoms. The high melting hydrophobic substance may include saturated fatty acid, vegetable wax, high melting triglyceride (mp≥60° C.), zinc fatty acid salt or a mixture thereof. The mineral supplement may include at least about 2 wt. % of the hydrophobic component. The mineral supplement may include no more than about 15 wt. % of the hydrophobic component. The mineral supplement may include about 3 to 10 wt. % of the hydrophobic component. The hydrophobic component may include tallow. The hydrophobic component may includes at least about 1 wt. % hydrogenated vegetable oil having a melting point of at least about 60° C. The mineral supplement may have a PDI of at least about 90%. The mineral supplement may have a fines content of no more than about 15 wt. %. The mineral supplement may have a PDI of at least about 50%, commonly at about 60%. The mineral source/non-protein nitrogen source combination may includes at least about 50 wt. % of the mineral source based on total combination weight. The mineral source may comprise a calcium source and salt (NaCl). The mineral supplement may comprise about 40 to 70 wt. % of the mineral source, about 10 to 50 wt. % non-protein nitrogen source; and about 3 to 10 wt. % of the hydrophobic component. The mineral source may comprise at least one of a calcium source, a sodium salt, a potassium salt, a phosphate source, a sulfur source, and a magnesium source. The mineral source may further comprise at least one of an iron source, a copper source, a cobalt source, a manganese source, a zinc source, and a selenium source. The mineral supplement may further comprise a binder. The binder may comprise bentonite, gum, lignin sulfonate, sodium silicate, attapulgite clay, calcium aluminates, or a mixture thereof. The mineral supplement may further comprise a filler. The filler may comprise wheat middlings, soy hulls, corn gluten meal, dried distillers grains, ground grains (e.g., corn, wheat, milo) or a mixture thereof. The filler may comprise cotyledon fiber, hull fiber, root vegetable fiber, bran fiber or a combination thereof. The filler may comprise wheat middlings, oilseed hull material, oilseed meal or a combination thereof. The mineral supplement may further comprise one or more vitamins, antibiotics, amino acids or a mixture thereof. An animal feed may comprise the pelleted mineral supplement.

According to another embodiment, a method of producing a pelleted mineral supplement comprises: forming a supplement blend including an ingredient component, which includes non-protein nitrogen source and at least about 50 wt. % mineral source based on total ingredient component weight; and a hydrophobic component, which includes a high melting hydrophobic substance having a melting point of least about 55° C.; forcing the supplement blend through an orifice to form a compressed blend; and dividing the compressed blend into segments. The method may further comprise drying the segments to provide dried segments. The supplement blend may comprise at least about 3 wt. % of the high melting hydrophobic substance fatty acid material; and at least about 70 wt. % of the ingredient component. The orifice may have a diameter of about 1 to 10 mm, commonly about 3 to 8 mm. The supplement blend may have a moisture content of no more than about 3 wt. %. The forcing step may comprise forcing the supplement blend through the orifice such that the orifice has a temperature of no more than 90° C. The supplement blend may have the composition of the mineral supplement explained in the preceding paragraph. The mineral supplement segments may have an average weight of about 250 to 500 mg or 325 to 425 mg. The supplement blend may comprise about 40 to 70 wt. % of the mineral source, about 10 to 50 wt. % non-protein nitrogen source; and about 3 to 10 wt % of the hydrophobic component. The supplement blend may comprise at least about 70 wt. % of a combination of the non-protein nitrogen source and the mineral source. The high melting hydrophobic substance may comprise hydrogenated vegetable oil, saturated fatty acid, vegetable wax, zinc fatty acid salt or a mixture thereof. A pelleted mineral supplement may be produced by this method.

According to another embodiment, a pelleted mineral supplement comprises: at least about 70 wt. % of an ingredient component, which includes non-protein nitrogen source and at least about 50 wt. % of a mineral source based on total ingredient component weight; and a hydrophobic component, which includes fatty acid material having a melting point of at least about 50° C. The fatty acid material may include stearic acid, palmitic acid or a mixture thereof. The ingredient component may comprise at least about 10 wt. % non-protein nitrogen source based on total ingredient component weight.

According to another embodiment, a pelleted mineral supplement comprises: at least about 70 wt. % of the combination of non-protein nitrogen source and a mineral source; and at least about 1 wt. % of a high melting hydrophobic substance having a melting point of least about 60° C. The mineral supplement may comprise at least about 80 wt. % of the mineral source/non-protein nitrogen source combination. The mineral supplement may comprise about 3 to 10 wt. % of a hydrophobic component, which includes the high melting hydrophobic substance. The mineral supplement may comprise at least about 1 wt. % fatty acid material having a melting point of least about 60° C. The mineral supplement may comprise at least about 1 wt. % hydrogenated vegetable oil having a melting point of at least about 60° C. The mineral supplement may comprise at least about 1 wt. % hydrogenated triglyceride material having a melting point of at least about 60° C. The hydrogenated triglyceride material may be partially hydrogenated triglyceride material. The hydrogenated triglyceride material may be fully hydrogenated triglyceride material. The hydrogenated triglyceride material may be hydrogenated oilseed oil material. The hydrogenated triglyceride material may be hydrogenated soybean oil, hydrogenated cottonseed oil, hydrogenated sunflower oil, hydrogenated palm oil, hydrogenated corn oil, or a mixture thereof. The mineral supplement may comprise a hydrophobic component, which includes the high melting hydrophobic substance. The hydrophobic component may further comprise tallow. The hydrophobic component may further comprise a partially hydrogenated vegetable oil, which has a melting point of no more than about 50° C., commonly 40-50° C. The mineral source may comprise at least one of a calcium source, a phosphate source and salt {NaCl}. The mineral source may comprise at least one of a calcium source, potassium source, or phosphorous source. The high melting hydrophobic substance may comprise saturated fatty acid having 14 to 22 carbon atoms. The high melting hydrophobic substance may comprise stearic acid, palmitic acid or a mixture thereof. The mineral supplement may comprise no more than about 15 wt. % of the hydrophobic component. The mineral supplement may comprise about 1 wt. % to 5 wt. % of the high melting hydrophobic substance. The hydrophobic component may include a triglyceride material having a melting point of about 40° C. to 50° C. The high melting hydrophobic substance may comprise fatty acid material having a melting point of at least about 60° C. The mineral supplement may further comprise a binder. The mineral supplement may further comprise one or more vitamins, medicaments, enzymes or a combination thereof. The mineral supplement may comprise a filler. The mineral supplement may have a PDI of at least about 90%. The mineral supplement may have a PDI of at least about 50%, commonly at least about 60%. The mineral supplement may have a fines content of no more than about 15 wt. %.

According to another embodiment, a pelleted mineral supplement comprises: at least about 75 wt. % of a combination of non-protein nitrogen source and a mineral source; at least about 0.5 wt. % of a high melting hydrophobic substance having a melting point of least about 60° C.; and a triglyceride material having a melting point of about 40° C. to 50° C. The mineral supplement may comprise no more than about 10 wt % of the triglyceride material. The mineral supplement may comprise about 1 to 5 wt. % of the high melting hydrophobic substance lipid component. The triglyceride material may comprise animal fat, vegetable fat, or a mixture thereof.

According to another embodiment, a mineral supplement prepared by the process comprising: pelleting a combination of components which includes at least about 50 wt. % of a combination of non-protein nitrogen source and a mineral source; and at least about 2 wt. % of a hydrophobic component, which includes a high melting hydrophobic substance; wherein the pelleting operation is conducted without exposing the components to steam.

According to another embodiment, a pelleted mineral supplement comprises: at least about 50 wt. % of a combination of non-protein nitrogen source and a mineral source; and at least about 2 wt. % of a hydrophobic component having a melting point of at least about 55° C. The mineral supplement may comprise at least about 75 wt. % of the mineral source/non-protein nitrogen source combination. The mineral supplement may comprise about 80 to 90 wt. % of the mineral source/non-protein nitrogen source combination; and about 3 to 10 wt. % of the hydrophobic component. The hydrophobic component may have a melting point of at least about 60° C. The hydrophobic component may comprise saturated fatty acid having 14 to 22 carbon atoms; vegetable wax; fully hydrogenated vegetable oil; or a mixture thereof. The hydrophobic component may comprise partially fractionated palm oil. The hydrophobic component may comprise hydrogenated soybean oil. The hydrophobic component may comprise stearic acid, palmitic acid or a mixture thereof. The hydrophobic component may comprise zinc stearate, zinc palmitate or a mixture thereof.

According to another embodiment, a mineral supplement comprises: at least about 75 wt. % of a combination of non-protein nitrogen source and a mineral source; and at least about 3 wt. % a hydrophobic component having a melting point of least about 55° C. The hydrophobic component may include a high melting hydrophobic substance having a melting point of least about 60° C. The high melting hydrophobic substance may include saturated fatty acid, vegetable wax, high melting triglyceride (mp≥60° C.), zinc fatty acid salt or a mixture thereof. The mineral supplement may comprise about 40 to 70 wt. % of the mineral source, about 10 to 50 wt. % non-protein nitrogen source; and about 3 to 10 wt. % of the hydrophobic component. The hydrophobic component may further comprise a triglyceride material, which has a melting point of about 40° C. to 50° C. The pelleted mineral supplement may have a PDI of at least about 85%. The pelleted mineral supplement may have a fines content of no more than about 15 wt. %. The pelleted mineral supplement may have a PDI of at least about 50%, commonly at least about 60%.

According to another embodiment, an animal feed comprises: bulk feed; and the mineral supplement of any of the preceding illustrative embodiments.

According to another embodiment, a pelleted mineral supplement comprises: at least about 70 wt. % of a combination of a mineral source and a non-protein nitrogen source; and a hydrophobic component, which includes a high melting hydrophobic substance having a melting point of least about 55° C. The non-protein nitrogen source comprises urea.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., common use and/or technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the claims are not tied and should not be interpreted to be tied to any particular embodiment, feature, or combination of features other than those explicitly recited in the claims, even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing Figures. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A pelleted mineral supplement comprising:
   (a) about 3 wt. % to about 20 wt. % urea;
   (b) 75 wt. % to about 85 wt. % of a mineral source; wherein the mineral source comprises a source of at least one of calcium, sodium, or potassium;
   (c) about 1 wt. % to about 10 wt. % of a hydrophobic component comprising:
      (i) a high melting point hydrophobic substance having a melting point of about 60° C. or greater; and
      (ii) animal tallow or vegetable oil having a melting point of about 50° C. or less;
   (d) up to about 20 wt. % filler; and
   (e) up to about 3 wt. % binder;
   wherein the pelleted mineral supplement has a PDI of about 85% or greater.

2. The pelleted mineral supplement of claim 1, wherein the mineral source comprises a calcium source and sodium chloride.

3. The pelleted mineral supplement of claim 1, wherein the mineral source comprises $CaCO_3$, NaCl, and KCl.

4. The pelleted mineral supplement of claim 1, wherein the filler comprises wheat middlings.

5. The pelleted mineral supplement of claim 1, wherein the pelleted mineral supplement has a PDI of about 90% or greater.

6. The pelleted mineral supplement of claim 1, wherein the high melting point hydrophobic substance comprises hydrogenated vegetable oil; saturated free fatty acids, or salts thereof.

7. The pelleted mineral supplement of claim 1, wherein the high melting point hydrophobic substance comprises stearic acid and palmitic acid.

8. The pelleted mineral supplement of claim 1, wherein the pelleted mineral supplement contains no more than about 15% fines.

9. The pelleted mineral supplement of claim 1, wherein the pelleted mineral supplement comprises 0.5 wt. % to 6 wt. % of the high melting point hydrophobic substance.

10. A method of producing a pelleted mineral supplement comprising:
    (A) forming a supplement blend comprising:
       (a) about 3 wt. % to about 20 wt. % urea;
       (b) 75 wt. % to about 85 wt. % of a mineral source; wherein the mineral source comprises a source of at least one of calcium, sodium, or potassium;
       (c) about 1 wt. % to about 10 wt. % of a hydrophobic component comprising:
          (i) a high melting point hydrophobic substance having a melting point of about 60° C. or greater; and
          (ii) animal tallow or vegetable oil having a melting point of about 50° C. or less;
       (d) up to about 20 wt. % filler; and
       (e) up to about 3 wt. % binder; and
    (B) forcing the supplement blend through an orifice and dividing it into pellets to form a pelleted mineral supplement having a PDI of about 85% or greater.

11. The method of claim 10, wherein the pelleted mineral supplement has a PDI of about 90% or greater.

12. The method of claim 10, wherein the pelleted mineral supplement contains no more than about 15% fines.

13. The method of claim 10, wherein the pelleted mineral supplement is produced without exposing the supplement blend to steam.

* * * * *